United States Patent [19]

Bresser et al.

[11] Patent Number: 5,560,762
[45] Date of Patent: Oct. 1, 1996

[54] PROCESS FOR THE HEAT TREATMENT OF FINE-GRAINED IRON ORE AND FOR THE CONVERSION OF THE HEAT TREATED IRON ORE TO METALLIC IRON

[75] Inventors: Wolfgang Bresser, Grossostheim; Martin Hirsch, Friedrichsdorf; Alpaydin Saatci, Frankfurt am Main, all of Germany

[73] Assignee: Metallgesellschaft AG, Frankfurt am Main, Germany

[21] Appl. No.: 385,994

[22] Filed: Feb. 9, 1995

[30] Foreign Application Priority Data

Mar. 24, 1994 [DE] Germany ............ 44 10 093.0
Oct. 20, 1994 [DE] Germany ............ 44 37 549.2

[51] Int. Cl.$^6$ ............................................. C21B 13/14
[52] U.S. Cl. ................. 75/447; 75/450; 423/439
[58] Field of Search ................... 75/447, 444, 450, 75/768, 433; 423/439

[56] References Cited

U.S. PATENT DOCUMENTS 3,928,021  12/1975  Matsubara et al. ............ 75/448
5,407,179   4/1995  Whipp ........................ 266/172

*Primary Examiner*—Melvyn Andrews
*Attorney, Agent, or Firm*—Felfe & Lynch

[57] ABSTRACT

Disclosed is a process for the heat treatment of fine-grained iron ore and for the conversion of the heat-treated iron ore to metallic iron, wherein a) the fine iron ore is reacted with at least one binder to produce particles having a particle size of >0.1 to 5 mm,
b) the particles according to process stage (a) are dried,
c) the particles dried according to process stage (b) are heat-treated at a temperature of 700° to 1100° C., and
d) the heat-treated particles are reacted to form metallic iron.

18 Claims, 3 Drawing Sheets

PROCESS FOR THE HEAT TREATMENT OF FINE-GRAINED IRON ORE AND FOR THE CONVERSION OF THE HEAT TREATED IRON ORE TO METALLIC IRON

BACKGROUND OF THE INVENTION

The present invention relates to a process for the heat treatment of fine-grained iron ore and for the conversion of the heat-treated iron ore to metallic iron. According to the invention the term "metallic iron" is understood to be metallic iron in the form of sponge iron and $Fe_3C$, in which the iron is present in the valence state 0, and mixtures of metallic iron and $Fe_3C$.

The direct reduction of iron ore has proved very effective in a fluidized bed. A particularly effective process is known from EP-PS 0 255 180. In the direct use of fine ores having a grain size <50 µm, unsatisfactory results are obtained upon direct reduction in the fluidized bed. What is disadvantageous therein is firstly incomplete separation in the hot cyclone and secondly that upon the final-reduction the fluidizing rate has to be reduced to such an extent that very large reactors have to be used, which is uneconomic.

The object of the present invention is to provide an economic and environmentally sound process for the heat treatment of fine-grained iron ore which cannot be converted directly to metallic iron. A further object of the present invention is to provide a process for the production of metallic iron from the heat-treated, fine-grained iron ore.

SUMMARY OF THE INVENTION

The object underlying the present invention is achieved in that a) the fine iron ore is reacted with at least one binder to produce particles having a particle size of from about 0.1 to 5 mm, b) the particles according to process stage (a) are dried, c) the particles dried according to process stage (b) are heat-treated at a temperature of 700° to 1100° C., d) the heat-treated particles are reacted to form metallic iron.

The fine iron ore according to process stage (a) can be processed with a binder in a granulator to produce granules having a grain size of <5 mm. The granules can be dried in a venturi drier according to process stage (b). The dried granules are hardened according to process stage (c). For this, short retention times of only a few minutes are required. A preferred form of the invention therefore consists in that granules are obtained as particles according to process stage (a). Very good results are obtained upon the heat treatment according to process stage (c) using granules.

A preferred form of the invention consists in that particles having a particle size of from about 0.1 to 3 mm are obtained according to process stage (a). Particles of this particle size can be produced very readily and yield very good results upon the heat treatment according to process stage (c).

A preferred form of the invention consists in that the dried particles are obtained at a temperature 150° to 300° C. according to process stage (b). Upon drying in this temperature range, particles are obtained with which very good results are achieved upon the heat treatment according to process stage (c).

A preferred form of the invention consists in that the particles are heat-treated at a temperature of 800° to 900° C. according to process stage (c). The best results are achieved at these temperatures.

A preferred form of the invention consists in that process stage (a) is performed with at least one binder, such as bentonite, slaked lime or Peridur®. These binders are highly suitable for the production of the particles. The slaked lime is $Ca(OH)_2$.

A preferred form of the invention consists in that the exhaust gases from the hardening stage according to process stage (c) are introduced into the drying stage according to process stage (b). Owing to this measure, the process according to the invention is particularly economic.

According to the invention, it is provided for that e) in a first reduction stage the substances containing iron oxides are charged into the fluidized bed reactor of a circulating fluidized bed system, hot reduction gas is introduced into the fluidized bed reactor as fluidizing gas, preliminary reduction of the iron oxides takes place, the suspension discharged from the fluidized bed reactor is largely freed of solids in the recycling cyclone of the circulating fluidized bed and the solids which have been separated off are returned into the fluidized bed reactor such that the solids circulation per hour within the circulating fluidized bed is at least five times the weight of solids present in the fluidized bed reactor, f) solids from the first reduction stage, in a second reduction stage, are passed into a conventional fluidized bed, hot reduction gas is passed into the conventional fluidized bed as fluidizing gas, the residual oxygen is broken down and the iron content is largely converted into $Fe_3C$, the exhaust gas from the conventional fluidized bed is passed as secondary gas into the fluidized bed reactor according to (e) and the $Fe_3C$-containing product is withdrawn from the conventional fluidized bed, g) the exhaust gas from the recycling cyclone according to (e) is cooled to below the dew-point and water is condensed out of the exhaust gas, h) a partial stream of the exhaust gas is withdrawn, i) the remaining partial stream, after strengthening by addition of reducing gas and heating as recycle gas, is passed partly as fluidizing gas into the fluidized bed reactor of the first reduction stage according to (e) and partly into the fluidized bed of the second reduction stage according to (f).

The circulating fluidized bed system consists of a fluidized bed reactor, a separator for separating off entrained solids from the suspension discharged from the fluidized bed reactor—generally a recycling cyclone—and a line for returning the solids separated off into the fluidized bed reactor. The principle of the circulating fluidized bed is distinguished in that—unlike the "conventional" fluidized bed, in which a dense phase is separated by a distinct step in density from the gas space overlying it—there are states of distribution without a defined boundary layer. There is no step in density between the dense phase and the dust space overlying it; however, the solids concentration within the reactor constantly decreases from the bottom to the top. A gas-solids suspension is discharged from the upper part of the reactor. When defining operating conditions by means of the Froude and Archimedes numbers, the following ranges are obtained:

$$0.1 \leq 3/4 \cdot Fr^2 \cdot \frac{\rho g}{\rho k - \rho g} \leq 10,$$

or $$0.01 \leq Ar \leq 100,$$

whereby $$Ar = \frac{d_k^3 \cdot g \, (\rho k - \rho g)}{\rho g \cdot v^2}$$

and $$Fr^2 = \frac{u^2}{g \cdot d_k}$$

u is the relative gas velocity in m/s
Ar is the Archimedes number
Fr is the Froude number
$\rho g$ is the density of the gas in kg/m$^3$
$\rho k$ is the density of the solids particle in kg/m$^3$
$d_k$ is the diameter of the spherical particle in m
v is the kinematic viscosity in m$^2$/sec
g is the gravitation constant in m/sec$^2$ The preliminary reduction in the circulating fluidized bed takes place to a degree of reduction of about 60 to 90%. In this range, the optimum value, which is dependent on the respective reduction behavior of the ore, is set relative to the utilization of the reduction gas, i.e. to the respective optimum throughput capacity. The temperature in the reactor of the circulating fluidized bed is set to about 550° to 650° C. Larger iron-ore agglomerates having a particle size of approximately 3 to 5 mm are broken down in the circulating fluidized bed to smaller agglomerates.

The portion of the solids which is passed from the first reduction stage into the second reduction stage can be taken from the return line of the circulating fluidized bed or from the fluidized bed reactor of the circulating fluidized bed. The charging of the solids into the fluidized bed reactor operating with a conventional fluidized bed takes place on a side which lies opposite the side on which the Fe$_3$C product is withdrawn. The conversion of the iron content of the solids charged into the conventional fluidized bed into Fe$_3$C takes place as extensively as possible. It is generally between 70 and 95%. The temperature in the conventional fluidized bed is set to about 550° to 650° C. The exhaust gas of the conventional fluidized bed is introduced as secondary gas into the fluidized bed reactor of the circulating fluidized bed at a height above the ground of up to 30% of the height of the reactor. The exhaust gas from the recycling cyclone of the circulating fluidized bed is cooled to such an extent that the water vapor content in the gas is reduced to below about 1.5%. The cooling generally takes place in a scrubber with cold water being injected in. In this case, at the same time residual dust is washed out of the gas. The volume of the partial stream of the exhaust gas which is withdrawn is set such that no enrichment of nitrogen, which is introduced with the strengthening gas, occurs in the recycle gas. Generally gas containing H$_2$ and CO which is produced from natural gas is used as the strengthening gas. The strengthened recycle gas is compressed again, heated up and then passed partly into the first and partly into the second reduction stage. The solids may be preheated before being charged into the fluidized bed reactor of the circulating fluidized bed. This is done under oxidizing conditions. If the solids consist of magnetite (Fe$_3$O$_4$) or contain relatively large quantities thereof, prior oxidation haematite (Fe$_2$O$_3$) is necessary.

The advantages of this process variant according to the invention consist in that the major part of the reduction takes place in the circulating fluidized bed, i.e. in a reactor having a relatively small diameter and without internal fittings with uniform flow. Owing to the very good exchange of mass and heat in the circulating fluidized bed, the reaction can be performed in a small unit with a relatively short retention time. The final reduction and the carburization, which require a longer retention time, take place in the conventional fluidized bed, which however can be kept substantially smaller owing to the small amount of residual reduction compared with a complete reaction in the conventional fluidized bed. Owing to the gas-side and solids-side coupling according to the invention of the two fluidized beds, the process is performed with a partial counter-current flow, which achieves a higher gas conversion or a lower gas consumption.

A preferred form of the invention consists in that 50 to 80% of the recycle gas is passed as fluidizing gas into the conventional fluidized bed of the second reduction stage according to (f) and the remaining recycle gas is passed as fluidizing gas into the fluidized bed reactor of the circulating fluidized bed according to (e). This means that there is a high supply of fresh reduction gas in the second reduction stage, and the excess present in the exhaust gas of the second reduction stage can be utilized optimally in the first reduction stage.

A preferred form of the invention consists in that the pressure in the first reduction stage according to (e) and the second reduction stage according to (f) is set such that the pressure in the upper part of the fluidized bed reactor of the circulating fluidized bed according to (e) is 3 to 6 bar. The entire system of the first and second reduction stage is then under a corresponding pressure, the pressure of the gas before entry into the fluidized beds being correspondingly higher. This pressure range yields particularly beneficial results, although in principle it is also possible to operate with a higher pressure.

A preferred form of the invention consists in that the conventional fluidized bed according to (f) is located in a reactor having a rectangular cross-section with a ratio of length to width of at least 2:1 and transversely-arranged overflow weirs for the solids. The overflow weirs are arranged parallel to the narrow sides of the reactor. They extend from the gas-permeable bottom to shortly below the surface of the fluidized bed. The solids flow from the introduction side across the weirs to the discharge side. Owing to the narrow, long shape of the reactor and the overflow weirs, remixing of more greatly reduced solids with less-reduced solids is largely avoided, so that a very good final reduction and carburization is achieved.

According to the invention, provision is alternatively made that j) in a first reduction stage the substances containing iron oxides are charged into the fluidized bed reactor of a circulating fluidized bed system, hot reduction gas is introduced as fluidizing gas into the fluidized bed reactor, preliminary reduction of the iron oxides takes place, the suspension discharged from the fluidized bed reactor is largely freed of solids in the recycling cyclone of the circulating fluidized bed and the solids separated off are returned into the fluidized bed reactor such that the solids circulation per hour within the circulating fluidized bed is at least five times the weight of solids present in the fluidized bed reactor, k) solids from the first reduction stage, in a second reduction stage, are passed into a conventional fluidized bed, hot reduction gas is passed into the conventional fluidized bed as fluidizing gas, the residual oxygen is removed and <50% of the iron content is converted into $Fe_3C$, the exhaust gas from the conventional fluidized bed is passed as secondary gas into the fluidized bed reactor according to (j) and the product is withdrawn from the conventional fluidized bed, l) the exhaust gas from the recycling cyclone according to (j) is cooled to below the dew-point and water is condensed out of the exhaust gas, m) a partial stream of the exhaust gas is withdrawn, n) the remaining partial stream, after strengthening by addition of reducing gas and heating as recycle gas is passed partly as fluidizing gas into the fluidized bed reactor of the first reduction stage according to (j) and partly into the fluidized bed of the second reduction stage according to (k).

The advantages of this process variant according to the invention reside in that the $H_2$ content in the reduction gas can be increased, which means that smaller quantities of recycle gas are required for the reduction. According to this process, the retention time in the second reduction stage, which is usually about nine hours, can be reduced to about five hours. Owing to the smaller quantity of the recycle gas, up to 50% of the energy required for the compression is correspondingly also saved. The product obtained after the second reduction stage can be transported and charged in briquette form like scrap. Owing to the smaller quantity of carbon in the resulting product, larger proportions, up to 100% of a total charge, can be used in the electric arc furnace.

A preferred form of the invention consists in that 50 to 80% of the recycle gas is passed as fluidizing gas into the conventional fluidized bed of the second reduction stage according to (k) and the remaining recycle gas is passed as fluidizing gas into the fluidized bed reactor of the circulating fluidized bed according to (j) and the fluidizing gases are set with an $H_2$ content of 85 to 95% by volume. This means that a high supply of fresh reduction gas occurs in the second reduction stage and the excess present in the exhaust gas of the second reduction stage can be utilized optimally in the first reduction stage. The carbon content in the product after the second reduction stage is 0 to 0.1% by weight. The advantage of this form according to the invention resides in that still higher $H_2$ contents and therefore still smaller quantities of recycle gas are used. This form results in a further reduction in the dimensions of the reactors, and yields a further saving for the electrical energy upon the compression of the recycle gases.

A preferred form of the invention consists in that 50 to 80% of the recycle gas is passed as fluidizing gas into the conventional fluidized bed of the second reduction stage according to (k) and the remaining recycle gas is passed as fluidizing gas into the fluidized bed reactor of the circulating fluidized bed according to (j) and the fluidizing gases are set with an $H_2$ content of 50 to 85% by volume. According to this form in accordance with the invention, a largely reduced product having an $Fe_3C$ content of <50%, which can be briquetted well and transported easily, is obtained economically and in a short time.

A preferred form of the invention consists in that the fluidizing gases are set with an $H_2$ content of 50 to 75% by volume. With this preferred measure, a product is obtained which can be produced particularly economically and can be briquetted particularly well.

A preferred form of the invention consists in that the pressure in the first reduction stage according to (j) and the second reduction stage according to (k) is set such that the pressure in the upper portion of the fluidized bed reactor of the circulating fluidized bed according to (j) is 1.5 to 6 bar. The entire system of the first and second reduction stage is then under a corresponding pressure, the pressure of the gas before entry into the fluidized beds being correspondingly higher. This pressure range yields particularly beneficial results, although in principle it is also possible to operate at higher pressure.

A preferred form of the invention consists in that the conventional fluidized bed according to (k) is located in a reactor having a rectangular cross-section with a ratio of length to width of at least 2:1 and transversely-arranged overflow weirs for the solids. The overflow weirs are arranged parallel to the narrow sides of the reactor. They extend from the gas-permeable bottom to shortly below the surface of the fluidized bed. The solids flow from the introduction side across the weirs to the discharge side. Owing to the narrow, long shape of the reactor and the overflow weirs, remixing of more greatly reduced solids with less-reduced solids is largely avoided, so that a very good final reduction and carburization is achieved.

A preferred form of the invention consists in that the product obtained according to process stage (k) is briquetted, preferably hot-briquetted.

According to the invention, provision is furthermore alternatively made that o) in a first fluidized bed substances containing iron oxides are reduced under weakly-reducing conditions to FeO with solid, carbon-containing reduction agent and oxygen-containing gas as fluidizing gas being supplied, and the FeO is reduced in a second fluidized bed under strongly reducing conditions to a 50 to 80% metallization and the retention time of the gas in the first fluidized bed is set to be so short that the reduction potential results maximally in the reduction to FeO, p) the gas-solids suspension discharged from the first fluidized bed is passed into a second fluidized bed, a strongly-reducing gas is introduced as fluidizing gas into the second fluidized bed, strongly reducing gas and a major part of the resulting calcined carbon-containing material are discharged from the upper part of the second fluidized bed, q) the calcined carbon-containing material is separated from the gas and is returned into the first fluidized bed, r) a portion of the gas is returned as fluidizing gas into the second fluidized bed after purification and $CO_2$-removal and the reduced material is discharged from the lower part of the second fluidized bed together with the remaining portion of the calcined carbon-containing material.

The fluidized bed reactors used are expanded fluidized beds. The term "expanded fluidized bed" is understood to mean fluidized beds which are operated above the free-falling velocity of the solids particles. This fluidized bed principle is distinguished in that—unlike the "conventional" fluidized bed, in which a dense phase is separated by a distinct step in density from the gas space overlying it—there are states of distribution without a defined boundary layer. There is no step in density between the dense phase and the dust space overlying it; however, the solids concentration within the reactor constantly decreases from the bottom to the top. A gas-solids suspension is discharged from the upper part of the reactor. In contrast to the circulating fluidized bed, however, the expanded fluidized bed has no internal solids circulation, i.e. the solids return line which opens into the fluidized bed reactor in the case of the circulating fluidized bed is missing in the expanded fluidized bed. However, this does not rule out the solids being introduced from an expanded fluidized bed into a second expanded fluidized bed.

All coals from anthracite to lignite, carbon-containing minerals and waste products—such as oil shale, petroleum coke or washery refuse—which are in the solid state at room temperature may be used as carbon-containing material. Preferably at least oxygen-enriched air is used as oxygen-containing gas. The retention time of the gas in the first fluidized bed is approximately in the range of 0.5 to 3 seconds and is set by selecting the height of the reactor. Within the above limit values, setting of the dwell time by controlling the gas velocity is also possible. The dwell time of the iron oxide-containing material in the first fluidized bed is approximately 0.2 minutes to 1.5 minutes. The average solids density in the first fluidized bed is 100 to 300 $kg/m^3$, relative to the empty furnace space. In the first fluidized bed, the larger iron ore agglomerates having a particle size of approximately 3 to 5 mm decompose into smaller agglomerates. No gas containing free oxygen is introduced into the second fluidized bed. The dwell time of the gas is set to above 3 seconds and the dwell time of the iron oxide-containing material is set to about 15 to 40 minutes. The second reactor correspondingly has a greater height than the first reactor. The average solids density in the lower part of the second fluidized bed beneath the means for introducing the gas-solids suspension from the first fluidized bed is 300 to 600 $kg/m^3$, relative to the empty furnace space. In the upper part, the average solids density is 50 to 200 $kg/m^3$. The introduction of the gas-solids suspension takes place at least 1 m above the supply means for the strongly-reducing fluidizing gas up to a height of at most 30% of the furnace height. Surprisingly, it was discovered that good separation of calcined carbon-containing material and reduced iron-containing material can be achieved in the second fluidized bed while maintaining these operating conditions, which contradicts the prevailing expert opinion.

The temperature in the fluidized beds is in the range of 850° to 1100° C., depending on the reactivity of the carbon-containing material. The reduced product is withdrawn from the lower part, with a certain amount of calcined carbon-containing material also being withdrawn with it. The fluidized beds can be operated without great excess pressure or with excess pressure of up to 20 bar. Part of the exhaust gas from the second fluidized bed is sent for other use, e.g. as fuel gas in a steam-generating plant for electric power generation. The reduced product can be sent for further processing in the hot state or after cooling, in which case the carbon-containing material can be separated off prior to this, e.g. by magnetic separation.

A preferred form of the invention consists in that the quantity of the calcined carbon-containing material which is recirculated is several times the quantity of the charged iron oxide-containing materials, and the heat content of the suspension passed from the first into the second fluidized bed is used to cover the heat consumption in the second fluidized bed.

The heat required in the second reactor is introduced by the gas-solids suspension from the first reactor, with the predominant quantity of heat being introduced by the calcined carbon-containing material serving as heat carrier. To this end, the temperature in the first fluidized bed is set to a value which is higher than the exit temperature from the second fluidized bed. The superheating in the first fluidized bed which is necessary for this depends on the quantity of the circulating calcined carbon-containing material.

A preferred form of the invention consists in that the entry temperature of the suspension into the second fluidized bed is 30° to 80° C. higher than the temperature of the strongly reducing gas withdrawn from the upper part and the quantity of the recirculated calcined carbon-containing material is 10 to 50 times the iron oxide-containing material used.

If the temperature of the superheating of the suspension in the first fluidized bed lies in the upper range, the quantity of material recirculated lies in the lower range, and vice versa. The optimum mode of operation consists in that the superheating takes place up to the maximum permitted temperature at which no sintering or baking-on yet takes place, and the quantity of material recirculated is kept correspondingly low. If the quantity drops below 10 times the quantity of material recirculated, impermissibly high temperature differences are yielded, which may lead to the melting point of the iron oxide-containing material and the ash of the carbon-containing material being exceeded. On the other hand, exceeding 50 times the quantity of the material recirculated results in a high pressure drop and hence in higher solids concentrations, which in turn hinder the desired separation in the second fluidized bed.

A preferred form of the invention consists in that the calcined carbon-containing material is separated out of the material discharged from the lower part of the second fluidized bed and at least part is recirculated into the first fluidized bed. This means that firstly the calcined carbon-containing material is returned into the process again and secondly a pure reduced product is obtained. If the reduced product is sent for final reduction, the carbon necessary for this can be added in an exactly metered quantity. This also applies for the melting-down of the reduced product.

The various features of novelty which characterize the invention are pointed out with particularity in the claims annexed to and forming a part of this specification. For a better understanding of the invention, its operating advantage and specific objects obtained by its use, reference should be had to the accompanying drawings and descriptive matter in which there is illustrated and described a preferred embodiment of the invention.

DESCRIPTION OF PREFERRED EMBODIMENTS

The invention will be explained in greater detail with reference to FIGS. 1 to 3 and an example.

Figure 1:
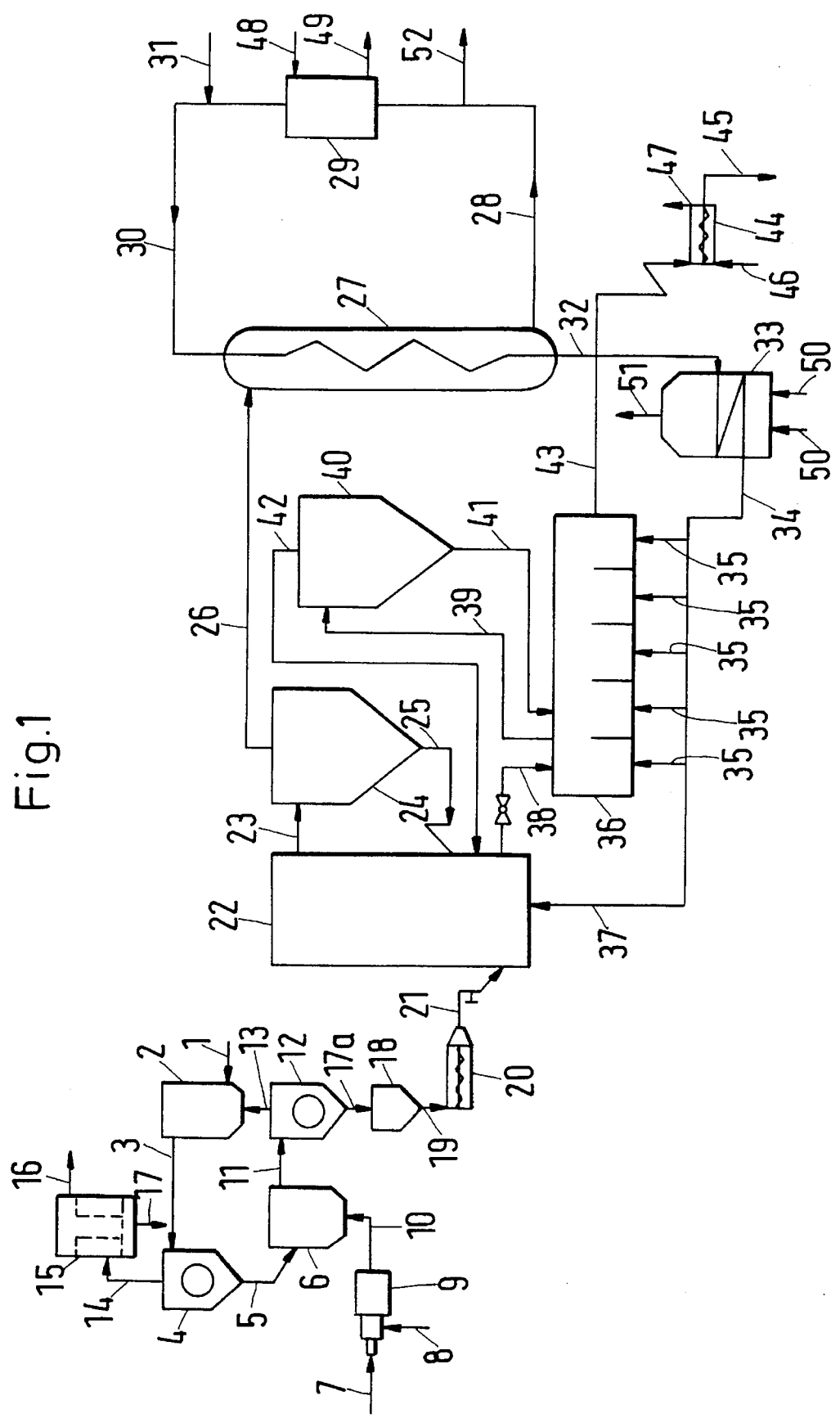
FIGS. 1 to 3 schematically depict systems for carrying out the process of the invention.

For the heat treatment of fine-grained iron ore and for the conversion of the heat-treated iron ore to metallic iron, granules are charged into the venturi preheater (2) via line (1) as schematically illustrated in FIG. 1. The suspension is passed via line (3) into the cyclone (4), where separation of gas and solids takes place. The solids separated off are passed into the venturi preheater (6) via line (5). Fuel is passed into the combustion chamber (9) via line (7), and combustion air via line (8). The hot combustion gases are passed into the venturi preheater (6) via line (10). The suspension is passed via line (11) into the cyclone (12), where separation of solids and gas takes place. The gas is passed into the venturi preheater (2) via line (13). The gas from the cyclone (4) is passed via line (14) into a filter (15), from which the purified gas is removed via line (16), and from which the dust separated off is removed via line (17). The solids separated off in the cyclone (12) are fed via line (17a) into the bin (18), from which they are removed via line (19) into the screw conveyor (20) and from there are passed via line (21) into the fluidized bed reactor (22) of the circulating fluidized bed. From the fluidized bed reactor (22), the gas-solids suspension is passed via line (23) into the recycling cyclone (24). The solids separated off are fed back into the fluidized bed reactor (22) via line (25). The gas from the recycling cyclone is passed into the heat exchanger (27) via line (26). The cooled gas is passed via line (28) into the scrubber (29), is cooled therein to below the dew-point of the water vapor, and the water vapor content is largely removed. The purified gas is passed via line (30) into the heat exchanger (27). Reducing gas is admixed via line (31) for strengthening. The preheated reduction gas is passed into the heater (33) via line (32) and is heated therein to the temperature required for the process. The heated gas leaves the heater (33) via line (34) and is passed in part as fluidizing gas via lines (35) into the fluidized bed reactor (36) of the conventional fluidized bed and the other part is passed as fluidizing gas into the fluidized bed reactor (22) of the circulating fluidized bed via line (37). Solids are passed from the fluidized bed reactor (22) of the circulating fluidized bed via line (38) into the fluidized bed reactor (36) of the conventional fluidized bed. The dust-containing exhaust gas from the fluidized bed reactor (36) of the conventional fluidized bed is passed via line (39) into the cyclone (40). The dust separated off is returned via line (41) into the fluidized bed reactor (36) and the gas is introduced into the fluidized bed reactor (22) of the circulating fluidized bed as secondary gas via line (42). The $Fe_3C$-containing product is passed from the fluidized bed reactor (36) of the conventional fluidized bed via line (43) into the cooler (44), is cooled therein and removed via line (45). Cooling water is passed into the cooler (44) via line (46), and is removed via line (47). Water is passed into the scrubber (29) via line (48) and is removed via line (49). Fuel and combustion air are passed into the heater (33) via the lines (50). The combustion gases are removed via line (51). A partial stream is removed from the recycle gas via line (52), which prevents enrichment of nitrogen in the recycle gas.

Figure 2:
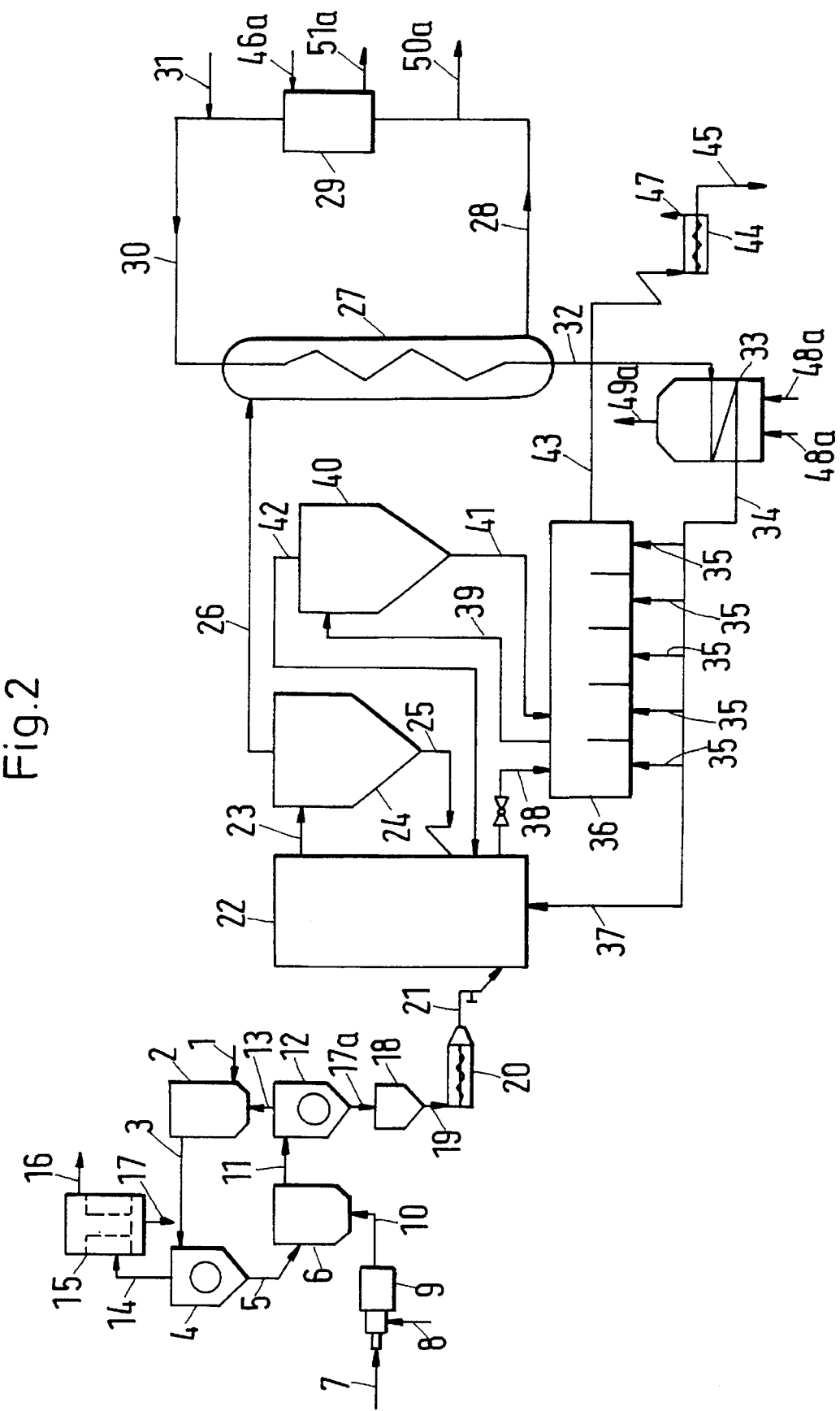

For the heat treatment of fine-grained iron ore and for the conversion of the heat-treated iron ore to metallic iron, granules are charged into the venturi preheater (2) via line (1) as schematically depicted in FIG. 2. The suspension is passed via line (3) into the cyclone (4), where separation of gas and solids takes place. The solids separated off are passed into the venturi preheater (6) via line (5). Fuel is passed into the combustion chamber (9) via line (7), and combustion air via line (8). The hot combustion gases are passed into the venturi preheater (6) via line (10). The suspension is passed via line (11) into the cyclone (12), where separation of solids and gas takes place. The gas is passed into the venturi preheater (2) via line (13). The gas from the cyclone (4) is passed via line (14) into a filter (15), from which the purified gas is removed via line (16), and from which the dust separated off is removed via line (17). The solids separated off in the cyclone (12) are fed via line (17a) into the bin (18), from which they are removed via line (19) into the screw conveyor (20) and from there are passed via line (21) into the fluidized bed reactor (22) of the circulating fluidized bed. From the fluidized bed reactor (22), the gas-solids suspension is passed via line (23) into the recycling cyclone (24). The solids separated off are fed back into the fluidized bed reactor (22) via line (25). The gas from the recycling cyclone is passed into the heat exchanger (27) via line (26). The cooled gas is passed via line (28) into the scrubber (29), is cooled therein to below the dew-point of the water vapor, and the water vapor content is largely removed. The purified gas is passed via line (30) into the heat exchanger (27). Reducing gas is admixed via line (31) for strengthening. The preheated reduction gas is passed into the heater (33) via line (32) and is heated therein to the temperature required for the process. The heated gas leaves the heater (33) via line (34) and is passed in part as fluidizing gas via lines (35) into the fluidized bed reactor (36) of the conventional fluidized bed and the other part is passed as fluidizing gas into the fluidized bed reactor (22) of the circulating fluidized bed via line (37). Solids are passed from the fluidized bed reactor (22) of the circulating fluidized bed via line (38) into the fluidized bed reactor (36) of the conventional fluidized bed. The dust-containing exhaust gas from the fluidized bed reactor (36) of the conventional fluidized bed is passed via line (39) into the cyclone (40). The dust separated off is returned via line (41) into the fluidized bed reactor (36) and the gas is introduced into the fluidized bed reactor (22) of the circulating fluidized bed as secondary gas via line (42). The product is passed from the fluidized bed reactor (36) of the conventional fluidized bed via line (43) into the briquetting plant (44), is briquetted therein and removed via line (45). Water is passed into the scrubber (29) via line (46a) and is removed via line (51a). Fuel and combustion air are passed into the heater (33) via the lines (48a). The combustion gases are removed via line (49a). A partial stream is removed from the recycle gas via line (50), which prevents enrichment of nitrogen in the recycle gas.

Figure 3:
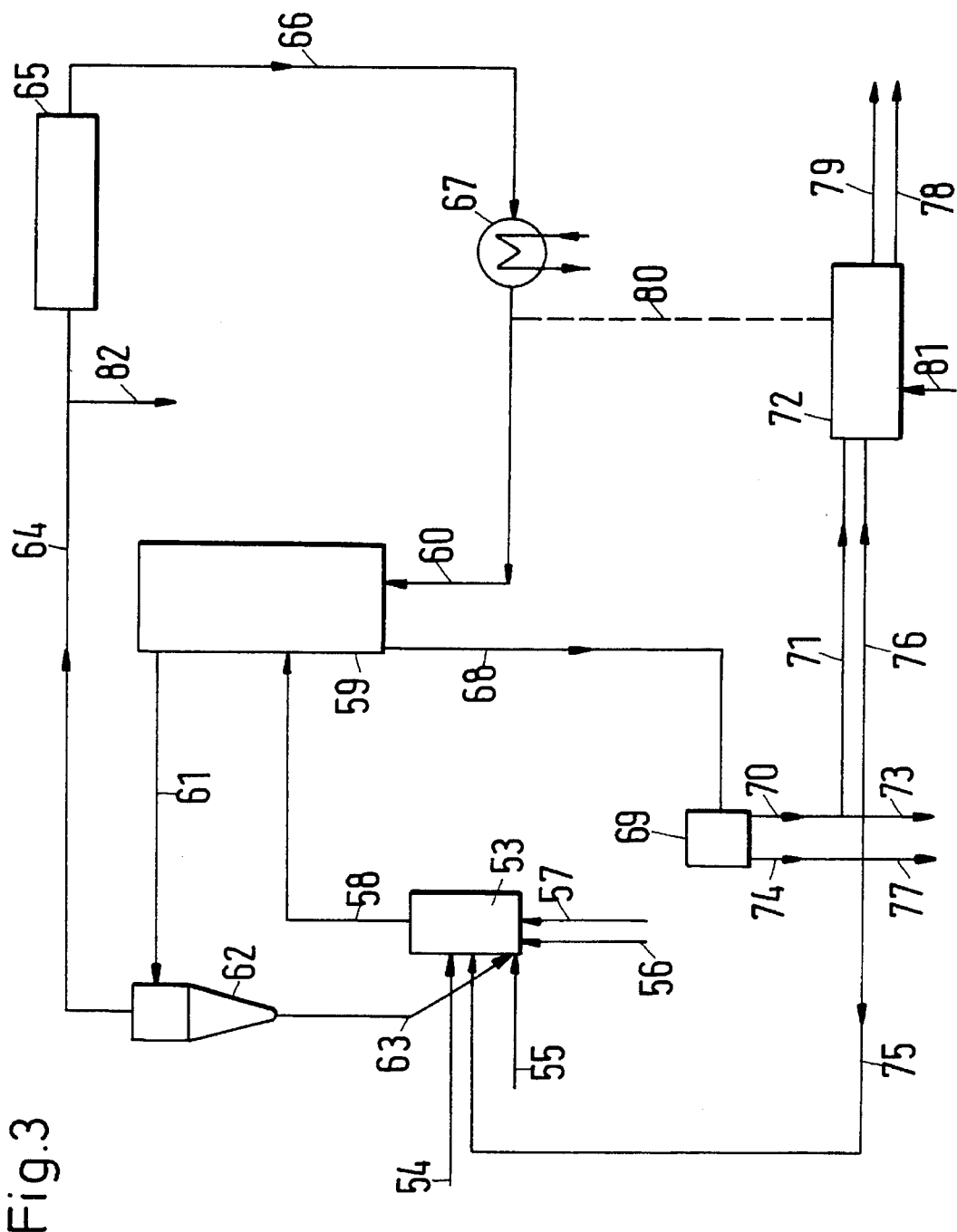

Referring to FIG. 3, ore, in the form of granules, from the preliminary heat treatment is blown via line (54) into the first fluidized bed (53), coal is blown in via line (55), oxygen is blown in via line (56) and air via line (57). The fluidized bed reactor (53) has an internal diameter of 0.06 m and a height of 6 m. The gas-solids suspension is discharged into the second fluidized bed (59) via line (58). This fluidized bed reactor (59) has an internal diameter of 0.08 m and a height of 20 m. An oxygen-free, strongly reducing gas is introduced into the second fluidized bed via line (60). A strongly reducing gas which contains a major part of the calcined carbon-containing material is withdrawn via line (61) into a cyclone separator (62). The solids separated out of the gas in the cyclone separator (62) pass via line (63) into the fluidized bed (53). The gas is passed via line (64) into a gas treatment stage (65), in which the gas is subjected to dust removal, is cooled and largely freed of $CO_2$ and $H_2O$. A partial stream of the gas is discharged from the circuit via line (82). The purified gas is passed after compression (not shown) via line (66) into a gas heater (67) and from there is passed via line (60) into the fluidized bed (59). Reduced ore and part of the calcined carbon are removed from the fluidized bed (59) via line (68) and are passed into a product treatment stage (69). After cooling and magnetic separation, the reduced ore is removed via line (70). It may be fed to a smelting reactor (72) via line (71) or be removed via line (73) as product. Calcined carbon-containing material is removed via line (74). It can be removed via line (75) into the fluidized bed (53), via line (76) into the smelting reactor (72) and via line (77) from the process. Molten pig iron is removed from the smelting reactor (72) via line (78) and slag via line (79). The exhaust gas of the smelting reactor (72) is passed via line (80), possibly after a gas purification stage (not shown), into line (60). The smelting reactor (72) can be designed as an electric-reduction furnace or as a converter, into which oxygen is blown via line (81).

EXAMPLE 87 kg iron ore concentrate having a water content of 5% by weight from flotation and a grain size d=25 μm with the following distribution:

| Fraction (μm) | Proportions by weight (% by weight) |
|---|---|
| 64 to 125 | 3.5 |
| 32 to 64 | 29.7 |
| 16 to 32 | 34.8 |
| 8 to 16 | 19.5 |
| 4 to 8 | 8.2 |
| 2 to 4 | 2.7 |
| 1 to 2 | 0.6 |
| <1 | 1.0 | containing the following constituents:

| Constituents | Proportions by weight (% by weight) |
|---|---|
| Total Fe | 69.1 |
| $SiO_2$ | 1.6 |
| $Al_2O_3$ | 1.5 |
| CaO | 0.29 | were mixed in a mixing granulator for 5 minutes with 1 kg bentonite, 8 kg fine dust from the gas purification stage of the heat treatment and 4 kg dust from the gas purification stage of the fluidized-bed reduction plant. The mixture had a water content of 7.6% by weight and the following distribution (sieve analysis):

| Grain size (mm) | Proportions by weight (% by weight) |
|---|---|
| 1.0 to 0.5 | 21.7 |
| 0.5 to 0.315 | 27.6 |
| 0.315 to 0.2 | 24.9 |
| 0.2 to 0.1 | 17.6 |
| <0.1 | 8.2 |

The mixture was dried in a highly-expanded fluidized bed and was heated to a temperature of 220° C., with the exhaust gas from the subsequent heat treatment being introduced at a temperature of 900° C. The dried material was heat-treated in a second highly-expanded fluidized bed at a temperature of 900° C. for 3 minutes. Air at 800 Nl/h was introduced into the fluidized bed as fluidizing gas, and natural gas was introduced as secondary gas. The exhaust gas had an oxygen content of 5% by volume. 8 kg fine dust were separated out of the heat-treatment stage, which dust was used to produce the above mixture. The granules hardened by the heat treatment had the following distribution (sieve analysis):

| Grain size (mm) | Proportions by weight (% by weight) |
|---|---|
| 1.0 to 0.5 | 14.8 |
| 0.5 to 0.315 | 26.1 |
| 0.315 to 0.2 | 24.6 |
| 0.2 to 0.1 | 22.1 |
| <0.1 | 12.4 | and contained the following constituents:

| Constituents | Proportions by weight (% by weight) |
|---|---|
| Total Fe | 66.8 |
| $Fe^{2+}$ | 3.0 |

The granules hardened by heat treatment were pre-reduced in a first reduction stage, a circulating fluidized bed, at 600° C. with a gas mixture consisting of 5.6% CO
4.7% $CO_2$
52.1% $H_2$
37.6% $CH_4$ and then finish-reduced in a second reduction stage, a conventional fluidized bed, at 600° C. with the following gas mixture:

8.5% CO
3.9% $CO_2$
57.7% $H_2$
29.9% $CH_4$

The product had the following analysis:
Total Fe 83.4%
Metallic Fe 66.4%
C 3.7%.

corresponding to a degree of metallization of 79.6% and a degree of carburation of 81.9%. The amount of fine dust produced was 4 kg and was recycled into the granulation process.

While it is apparent that the invention herein disclosed is well calculated to fulfill the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A process for the heat treatment of fine-grained iron ore and for the conversion of the heat-treated iron ore to metallic iron, comprising:

blending the fine iron ore with at least one binder to produce particles having a particle size of from about 0.1 to 5 mm;

drying the particles;

heat treating dried particles at a temperature of 700° to 1100° C.;

in a first reduction stage, charging the heat-treated particles into a fluidized bed reactor of a circulating fluidized bed system, introducing hot reduction gas into the fluidized bed reactor as fluidizing gas and forming a gas-solids suspension of the charged particles, preliminary reducing the heat treated particles, discharging the suspension from the fluidized bed reactor and removing solids from the suspension in a recycling cyclone of the circulating fluidized bed system, and returning the solids which have been separated off to the fluidized bed reactor such that the solids circulation per hour within the circulating fluidized bed system is at least five times the weight of solids present in the fluidized bed reactor;

passing the solids from the first reduction stage, in a second reduction stage, into a conventional fluidized bed, passing hot reduction gas into the conventional fluidized bed as fluidizing gas, the residual oxygen is broken down and the iron content is largely converted into $Fe_3C$, passing the exhaust gas from the conventional fluidized bed reactor as secondary gas into the fluidized bed reactor of the circulating fluidized bed system;

withdrawing the $Fe_3C$-containing product from the conventional fluidized bed;

cooling the exhaust gas from the recycling cyclone of the circulating fluidized bed system to below the exhaust gas dew-point and condensing water out of the exhaust gas;

withdrawing a partial stream of the exhaust gas;

passing the remaining partial stream, after strengthening by addition of reducing gas and heating as recycle gas, partly as fluidizing gas into the fluidized bed reactor of the first reduction stage and partly into the fluidized bed of the second reduction stage.

2. The process of claim 1 wherein the particles obtained by the blending of iron ore and binder are granules.

3. The process of claim 1 wherein particles obtained by the blending of iron ore and binder have a particle size of from about 0.1 to 3 mm.

4. The process of claim 1 wherein the drying of the particles is at a temperature of 150° to 300° C.

5. The process of claim 1 wherein the heat treating of the particles is at a temperature of 800° to 900° C.

6. The process of claim 1 wherein the heat treating stage generates exhaust gas and the gas is used to dry the particles formed from the iron ore and binder.

7. A process for the heat treatment of fine-grained iron ore and for the conversion of the heat-treated iron ore to metallic iron, comprising:

blending the fine iron ore with at least one binder to produce particles having a particle size of from about 0.1 to 5 mm;

drying the particles;

heat treating the dried particles at a temperature of 700° to 1100° C.;

in a first reduction stage, charging the heat-treated particles into a fluidized bed reactor of a circulating fluidized bed system, introducing hot reduction gas as fluidizing gas into the fluidized bed reactor and forming a gas-solids suspension of the charged particles, preliminary reducing the iron oxides, discharging the suspension from the fluidized bed reactor and largely freeing the suspension of solids in a recycling cyclone of the circulating fluidized bed system, returning the solids separated off into the fluidized bed reactor such that the solids circulation per hour within the circulating fluidized bed is at least five times the weight of solids present in the fluidized bed reactor;

passing the solids from the first reduction stage, in a second reduction stage, into a conventional fluidized bed, passing hot reduction gas into the conventional fluidized bed as fluidizing gas, the residual oxygen is broken down and <50% of the iron content is converted into $Fe_3C$, passing an exhaust gas from the conventional fluidized bed as secondary gas into the fluidized bed reactor of the circulating fluidized bed system, and withdrawing product from the conventional fluidized bed;

cooling the exhaust gas from the recycling cyclone of the circulating fluidized bed system to below the dew-point and condensing water out of the exhaust gas, a partial stream of the exhaust gas is withdrawn, the remaining partial stream, after strengthening by addition of reducing gas and heating as recycle gas is passed partly as fluidizing gas into the fluidized bed reactor of the first reduction stage and partly into the fluidized bed of the second reduction stage.

8. The process of claim 7 wherein the particles obtained by the blending of the iron ore and binder are granules.

9. The process of claim 7 wherein particles obtained by the blending of the iron ore and binder have a particle size of from about 0.1 to 3 mm.

10. The process of claim 7 wherein the drying of the particles is at a temperature of 150° to 300° C.

11. The process of claim 7 wherein the heat treating of the particles is at a temperature of 800° to 900° C.

12. The process of claim 7 wherein the heat treating stage generates exhaust gas and the gas is used to dry the particles formed from the iron ore and binder.

13. A process for the heat treatment of fine-grained iron ore and for the conversion of the heat-treated iron ore to metallic iron, comprising:

blending the fine iron ore with at least one binder to produce particles having a particle size of from about 0.1 to 5 mm;

drying the particles;

heat treating the dried particles at a temperature of 700° to 1100° C.;

charging the heat treated particles to a first fluidized bed wherein the heat-treated particles are reduced under weakly-reducing conditions to FeO with solid, carbon-containing reduction agent and oxygen-containing gas as fluidizing gas and forming a gas-solids suspension, setting the dwell time of the gas in the first fluidized bed so that the reduction potential results maximally in the reduction to FeO;

discharging the gas-solids suspension from the first fluidized bed and passing it into the second fluidized bed, introducing a strongly-reducing gas as fluidizing gas into the second fluidized bed, reducing the FeO in the second fluidized bed under strongly reducing conditions to a 50 to 80% metallization, discharging from an upper part of the second fluidized bed strongly reducing gas and a major part of the resulting calcined carbon-containing material; separating the calcined carbon-containing material from the gas and returning the separated material into the first fluidized bed, returning a portion of the gas as fluidizing gas into the second fluidized bed after purification and $CO_2$ removal, discharging the reduced material from the lower part of the second fluidized bed together with the remaining portion of the calcined carbon-containing material.

14. The process of claim 13 wherein the particles obtained by the blending of the iron ore and binder are granules.

15. The process of claim 13 wherein particles obtained by the blending of the iron ore and binder have a particle size of from about 0.1 to 3 mm.

16. The process of claim 13 wherein the drying of the particles is at a temperature of 150° to 300° C.

17. The process of claim 13 wherein the heat treating of the particles is at a temperature of 800° to 900° C.

18. The process of claim 13 wherein the heat treating stage generating an exhaust gas and the gas is used to dry the particles formed from the iron ore and binder.

* * * * *